No. 682,184.  
W. C. FISH.  
ELECTRIC LIGHTING BY LOW FREQUENCY CURRENTS.  
(Application filed Jan. 26, 1901.)  
Patented Sept. 10, 1901.

(No Model.)

Witnesses.
John Ellis Glenn.
Benjamin B. Hill.

Inventor:
Walter C. Fish
by Albert G. Davis
Atty.

UNITED STATES PATENT OFFICE.

WALTER C. FISH, OF LYNN, MASSACHUSETTS, ASSIGNOR TO GENERAL ELECTRIC COMPANY, OF NEW YORK.

ELECTRIC LIGHTING BY LOW-FREQUENCY CURRENTS.

SPECIFICATION forming part of Letters Patent No. 682,184, dated September 10, 1901.

Application filed January 26, 1901. Serial No. 44,776. (No model.)

*To all whom it may concern:*

Be it known that I, WALTER C. FISH, a citizen of the United States, residing at Lynn, county of Essex, State of Massachusetts, have invented certain new and useful Improvements in Electric Lighting by Low-Frequency Currents, (Case No. 1,517,) of which the following is a specification.

This invention relates to electric lighting; and its object is to enable alternating currents of low frequency to be used for illuminating purposes. Ordinarily a single-phase alternating current must have high frequency in order to maintain an arc without disagreeable flickering. To prevent this flickering with low-frequency currents it has been proposed to use multiphase currents and a plurality of electrodes, one for each lead of the circuit and one for the return or compensating wire, as set forth, for instance, in the patent to E. W. Rice, Jr., No. 641,891. With an organization of this kind some one of the phases was always active in maintaining the arc, as there were no intervals of zero potential at the arc-terminals, and a steady light was produced at much lower frequency than was at that time possible with a single-phase current. By my invention, however, a low-frequency single-phase current can be used to produce the same result, which I accomplish by providing two arcs or other illuminants fed from the same single-phase lead, one or both of them, however, being in circuit with or otherwise in operative relation to, a phase-modifying device, so that the currents differ in phase from one another. By thus "splitting the phase," so to speak, the light is maintained during the interval when a single arc or the like would be at zero potential. The invention is applicable to any kind of electric lamp, whether of the arc, incandescent or pyro-electrolytic type.

Figure 1:
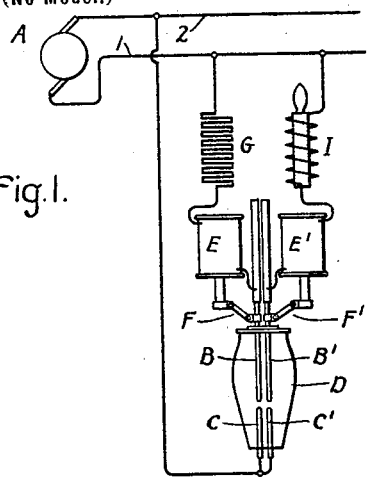
Figure 2:
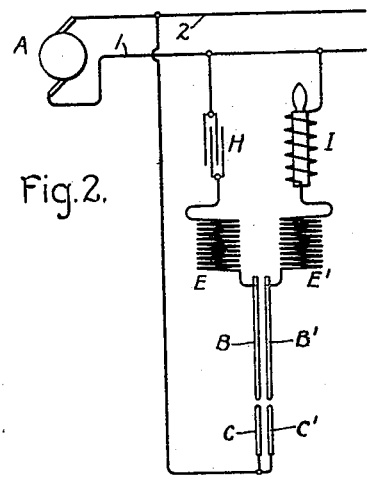
Figure 3:
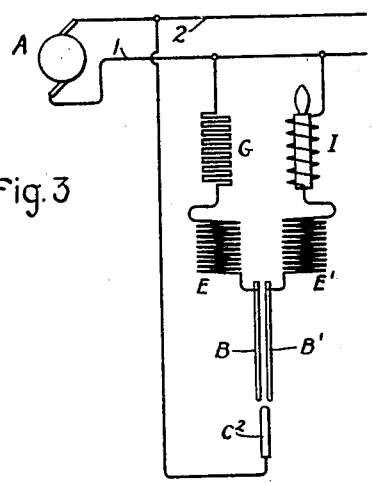
Figure 4:
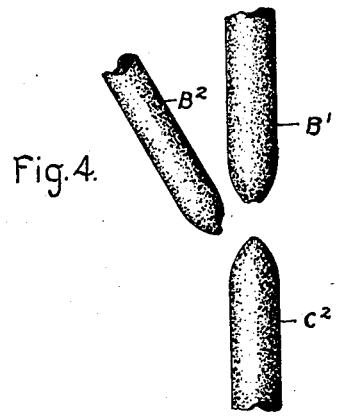
Figure 5:
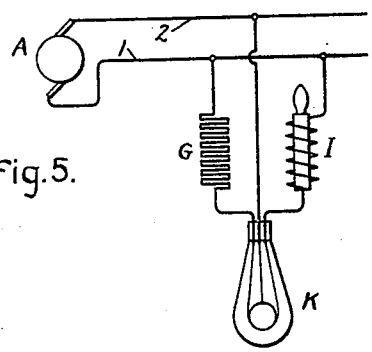
Figure 6:
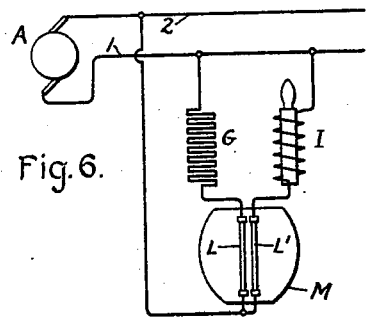

In the accompanying drawings, Figure 1 is a diagrammatic representation of an arc-lamp embodying my invention. Fig. 2 is a diagram of a modification. Fig. 3 shows a further modification. Fig. 4 is a view of the adjacent ends of three carbon electrodes. Fig. 5 shows the invention applied to an incandescent lamp. Fig. 6 shows it applied to a pyro-electrolytic lamp.

Referring to Fig. 1, let A be a generator of single-phase alternating currents feeding the leads 1 2. Two pairs of carbon electrodes B C B' C' are arranged parallel and close together, preferably both pairs inside of one globe D. One carbon of each pair has a regulating-coil E E' and clutch F F'. Each coil is connected in series with its own carbon B B' and is fed with single-phase alternating current from the lead 1. Coil E takes its current through a non-inductive resistance G, Fig. 1, or a condenser H, Fig. 2. Coil E' takes its current through an inductive resistance I. The lower carbons C C' are both connected with the lead 2.

In operation the current flowing through the inductive resistance I lags behind that flowing through the non-inductive resistance G or condenser H by a certain angle which preferably should approach a quarter-phase. The result, if a true ninety-degree relation is secured, is that the arc between the carbons B C rises to maximum potential when the arc between the carbons B' C' is at zero potential, and as the latter rises the former falls until, as the leading current passes the zero-point, the lagging current has reached its maximum. The two arcs are therefore continually changing in relative value, one rising either in the positive or negative direction as the other falls. The light from the arcs, taking them together, is thus maintained at nearly a constant value. Even with a phase displacement very much less than ninety degrees the light is much improved.

In Fig. 3 a single large lower carbon C is used in place of the two carbons C C'. (Shown in Figs. 1 and 2.) One of the upper carbons may be smaller than the other, as shown in Fig. 4, where the leading current is led through the smaller or auxiliary carbon $B^2$, placed within arcing distance of the lower carbon $C^2$. The arc between this auxiliary carbon and the lower carbon will be sprung without difficulty on each wave, as at the time when the potential rises in this circuit there is already existing a strong arc between the two large carbons $B'$ $C^2$. When, however, the current in the lagging circuit is passing through zero, there will be then a perceptible arc between the auxiliary carbon and the lower carbon, so that when the voltage in the lagging circuit rises either in the positive or negative direction it will not be obliged to break out a new path for itself, but will pass through the auxiliary arc. Thus the percentage of the wave which is dark is greatly reduced and a larger percentage of light is obtained on low-frequency currents.

In Fig. 5 I have shown an incandescent lamp K, with one terminal of its filament connected with the main lead 1 through the non-inductive resistance or condenser and the other terminal connected with the same lead through the inductive resistance. The middle of the filament is connected with the other main lead 2, and in operation the halves of the filament will become alternately bright and dim.

In Fig. 6 the two pairs of carbons are replaced by pyro-electrolytic illuminants L L', placed close together. A single transparent or translucent inclosure M may be used, if desired. As the displaced current rises and falls a quarter-phase behind the leading current the two illuminants alternately increase and decrease in brilliancy.

What I claim as new, and desire to secure by Letters Patent of the United States, is—

1. The combination with two leads carrying a single-phase alternating current of low frequency, of illuminants placed close together, and taking current from said leads, and means for causing, in the normal operation of the device, a relative phase displacement of the current flowing through said illuminants.

2. The combination with two leads carrying a single-phase alternating current of low frequency, of two illuminants placed close together, and connected across said leads, and an inductive resistance in series with one of said illuminants.

3. The combination with two leads carrying a single-phase alternating current of low frequency, of two illuminants placed close together, and connected across said leads, an inductive resistance in series with one of said illuminants, and a non-inductive resistance in series with the other.

4. The combination with two leads carrying a single-phase alternating current of low frequency, of two upper carbons placed close together and connected to one of said leads, a single lower carbon in arcing relation to both the upper carbons and connected with the other lead, means for independently regulating the upper carbons, and means for causing a phase lag in the current flowing to one of said upper carbons.

5. The combination with two leads carrying a single-phase alternating current of low frequency, of a pair of carbons connected across said leads, an inductive resistance in series therewith, and an auxiliary carbon in arcing relation to the lower carbon of the pair and connected with the same lead as the inductive resistance.

In witness whereof I have hereunto set my hand this 22d day of January, 1901.

WALTER C. FISH.

Witnesses:
DUGALD McK. McKILLOP,
JOHN J. WALKER.